Oct. 6, 1931. J. L. ANDERSON 1,826,377
METHOD OF INSTALLING WELDED PIPE SYSTEMS AND FITTINGS THEREFOR
Filed Jan. 13, 1928  2 Sheets-Sheet 2
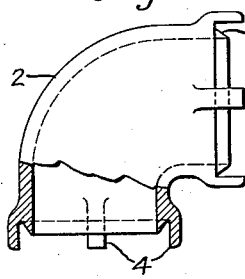
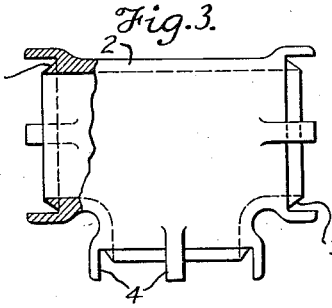
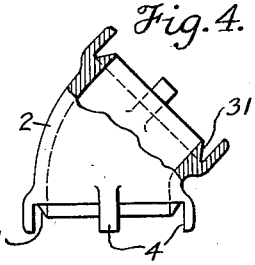
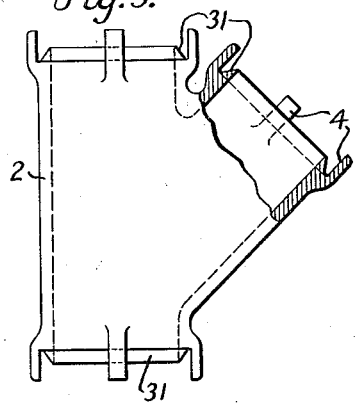
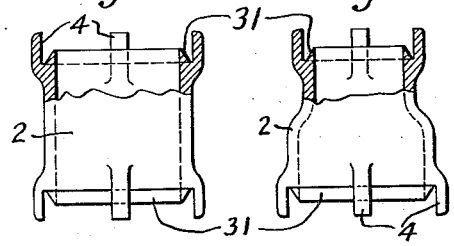
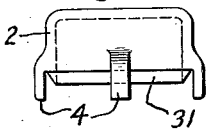
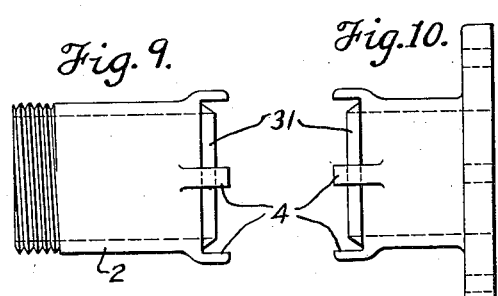
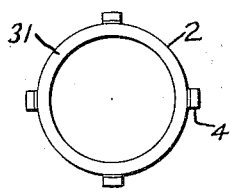

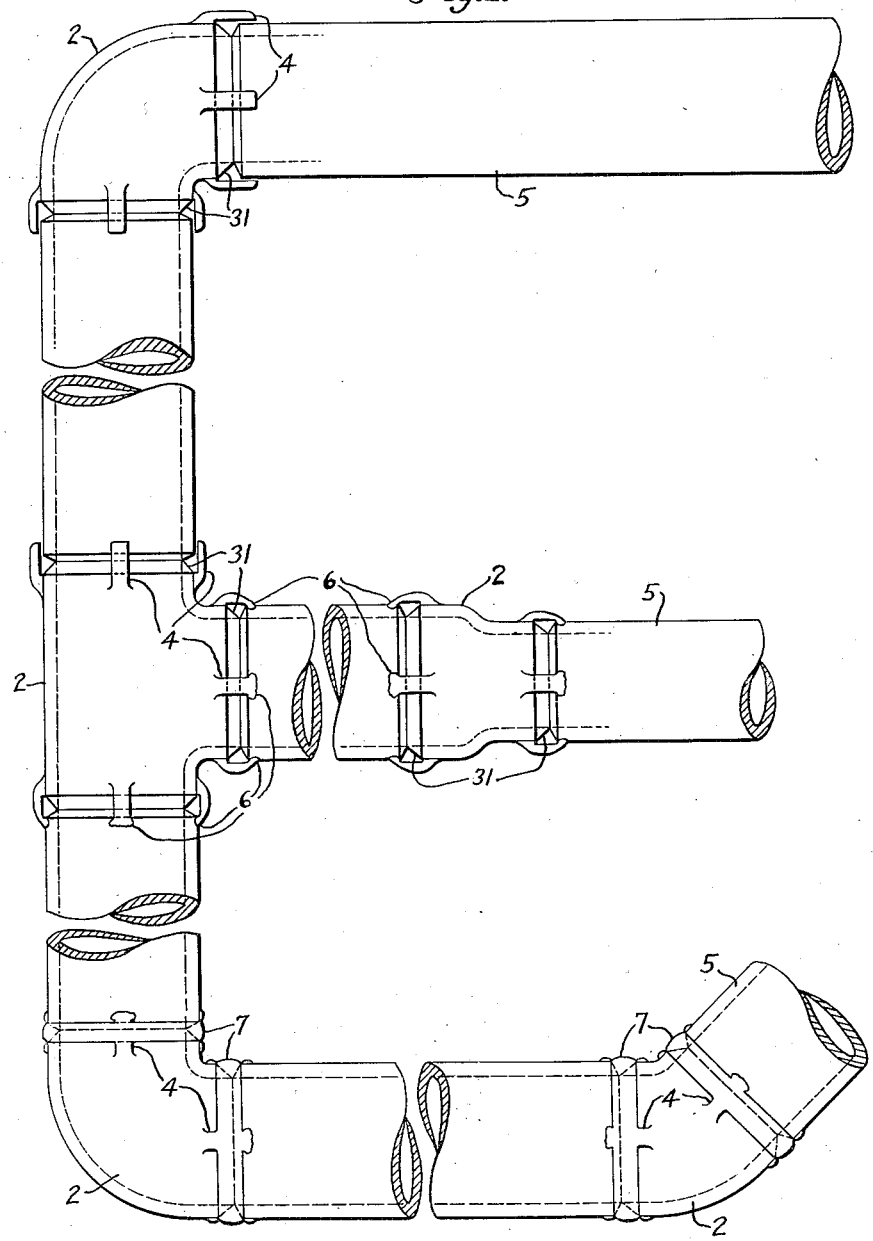

Patented Oct. 6, 1931

1,826,377

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

METHOD OF INSTALLING WELDED PIPE SYSTEMS AND FITTINGS THEREFOR

Application filed January 13, 1928. Serial No. 246,450.

The general purpose of the invention is to make it possible to install pipe systems in buildings and elsewhere with less labor than is required in the ordinary methods using screwed or flanged connections, and also to provide a pipe system of greater durability and strength than is possible with screwed fittings at a comparable cost.

These and other important objects and advantages are attained by an application of fusion welding with special fittings.

The preformed fittings, which constitute one part of the invention are castings or their equivalent, capable of being strongly weldable to pipe by fusion welding. Four or more lugs are cast at each outlet or opening of a fitting in positions which will accurately locate the pipe or nipple which is to be welded to the fitting, or to locate the fitting in relation to the pipe. Each edge of each opening, including the portions which are beneath the lugs, is beveled on the outside at an angle of about 45°. The locating lugs extend beyond the planes of the faces of the fittings where the fittings and pipe abut, a distance sufficient to aline and support the pipe and fittings in position preparatory to welding. The lugs disposed in definite locations about the axes of the openings of the fittings may also serve as a convenient means for setting the various fittings of the installation in respect to alinement about the axes.

The remainder of the system consists essentially of pipe cut to the proper lengths.

In carrying out the method the parts of the system are set up, positioned and temporarily supported or engaged in assembly by aid of the lugs, the ends of the fittings abutting the ends of the pipe and nipples, the positions are fixed by tack-welding the lugs to the pipe lengths or nipples, and finally the joints are welded circumferentially by fusion, which may be accomplished by means of an oxyacetylene or like torch, with addition of molten metal in the grooves formed by the bevels.

The invention is applicable to steam, air, gas, hydraulic, and vacuum pipe systems, the operations for erection in any case being very simple.

In the accompanying drawings, forming part hereof:

Fig. 1 is a schematic view of a portion of a pipe system illustrating different steps in the method;

Figs. 2 to 10 are elevations, with portions broken away and in section, of various forms of fittings after the invention; and Fig. 11 is an end or face view of a fitting.

The fittings shown in Figs. 2 to 10 are, in their order, an elbow, a T, a 45° elbow, a Y, a straight coupling, a reducing coupling, a cap, a nipple for welding to a screw connection, and one-half of a flange union for welding. These are illustrative, the invention being applicable to fittings of all forms.

The fittings, designated, without distinction, by the reference character 2 may be steel castings, if the pipe used is steel or wrought iron. They may be of the grade of steel known as open-hearth low carbon, and are furnished thoroughly cleaned, either by pickling or sand blasting, in a condition which will be satisfactory for welding without any further preparation on the job. However, the invention is not limited to the materials of which the pipe and fittings are made, as long as they are susceptible of being joined in an integral system by fusion.

The edge faces of the fittings are beveled on the outside all the way around their outlets or openings, as indicated at 31, the bevels extending to or substantially to the inside surface. Each fitting has a plurality of circular openings for the passage of fluid to or from the adjoining pipe lengths or nipples, and it is convenient to refer to all of such openings as "outlets". The edge of each outlet lies substantially in a plane, and likewise the abutting edge of each pipe length or nipple lies in a plane; in other words the edges are adapted to abut in any position of relative rotation about the axis.

The locating lugs are marked 4. These are cast on the outside of the fittings, in positions spaced around each outlet, the lugs joining with the bodies of the fittings immediately behind the beveled edges and projecting in an endwise direction beyond these edges. The number of the lugs may be varied, four being illustrated as sufficient, and they occupy corresponding positions throughout the fittings. The inner sides of the lugs are tangent or conform to a circle corresponling roughly to the outside diameter of the pipe to be used, the circle being sufficiently larger than the pipe to permit the pipe ends to be readily introduced into the lugs, and to permit of some slight angularity between the axes where that may be desirable in some parts of a system.

In Fig. 1 the nipples or lengths of pipe entering into the system are marked 5. The beveling of the ends or faces of the fitting renders it unnecessary to bevel the ends of the pipe more than they are beveled by cutting with ordinary pipe cutters. Naturally, however, the pipe ends might be beveled to a greater extent by a special operation, if desired, or pipe cutters could be used which would leave the nipples and pipe lengths with a more pronounced bevel. The fittings can, of course, be cast with bevels at any angle steeper than 45°

The purpose of the bevels is to form grooves which enable melt welding by the high temperature flame or other fusion welding agency to penetrate all the way through to the inside. The groove is filled with fused metal from a welding rod, in accordance with known practice, forming a strong welded joint even with the outside surface, or raised.

The general procedure of erecting a pipe system in accordance with the invention is as follows:

When the piping layout has been satisfactorily planned and connecting points definitely established, the hangers or other supporting members can be erected more or less completely. Piping cut to the proper length can be erected in the hangers. On one, or possibly both, ends of one or more lengths of pipe there can be tacked, or even completely welded, the proper fitting or fittings for the position, prior to the erection of the pipe, if desirable. In general, the parts of sub-assemblies can be welded together before erection whenever it is more convenient to do so. Otherwise the pipe lengths, nipples and fittings are put together in the system in abutting relation. The locating lugs on the outlets of the fittings temporarily support the adjoining pipe in position, or enable the pipe to support the fittings, and furnish sufficient metal for making positioning tack-wells. The entire system, or parts of it, can be erected and tacked in position preparatory to welding completely at a later time, or the joint-welding operation can immediately follow the erecting or tacking operation. In places, the preliminary tack-welding may be omitted. The use of the lugs first to position and then to tack the parts together is particularly advantageous since it enables the erectors to fix the parts of the system in precisely the desired positions and relations as to alinement, axial angularity and rotational angularity, after which skilled welders can make the joints without other responsibility.

Tack-welds formed by fusing the lugs to the side of the pipe are indicated at 6 in Fig. 1. The grooves formed at abutting faces of fittings and pipes before the joints are welded are seen, and certain of the joints which have been welded, with added metal filling the grooves, are marked 7. In making the welds 7 the lugs 4 are fused down still further, furnishing some of the metal for the final weld.

Irregularity in the alinement of the fittings and pipe due to pitch or inaccuracies in location is permissible, and will not interfere with successful welding, or with the flow of fluid through the pipe and fitting when the pipe system is in use. The correct pitch can be established in all cases without bending the pipes or other special preparation.

Special fittings or extremely short connections can be made by welding fittings together without intervening piping, or even by cutting fittings to smaller dimensions, thereby permitting still closer coupling.

In general, the present plan enables connections to be made in locations where they could not be made with screw or flange fittings.

Fittings or welds found defective upon test can be repaired without disassembling the piping system.

The invention admits of the use of screw-threads where necessary to attach to threaded openings on fixtures or other standard parts. Where valves are required, threaded or flange connections may be desirable to avoid possible damage to valves by welding close to the valve body. Also, where expansion or contraction must be provided for in a limited area, it may be desirable to resort to screwed connections at those points.

Among the advantages resulting from the invention are lower manufacturing and erecting cost than is possible with similar quality screw fittings, greater strength to resist working or other stresses, less danger of leaks after the pipe system is in operation, less labor required in laying out and erecting, a perfectly smooth interior with consequent reduction in friction, less space required for erection in close quarters, and less time required for erection and welding than is ordinarily required for threading and making-up in position. Complete welded pipe lines can be made economically, where heretofore flanged construction was necessary because of the pressures or temperatures of the fluid under transmission.

I claim:

1. A preformed pipe fitting for erection and installation of welded piping systems, said fitting being designed to be strongly weldable to pipe by fusion welding and having a plurality of locating lugs, more than two in number, at several points around its outlets to receive the ends of adjoining nipples or pipe lengths for temporary support and to facilitate alining, said lugs adapted for fusing down in making tack-welds to adjoining pipe prior to the actual welding of the joints.

2. A preformed pipe fitting for erection and installation of welded piping systems, said fitting being strongly weldable to pipe by fusion welding and having a plurality of locating lugs at several points around its outlet to receive the ends of adjoining nipples or pipe lengths for temporary support and to facilitate alining, said lugs adapted for fusing down in making tack-welds to adjoining pipe prior to the actual welding of the joints, and the boundaries of the outlets of the fittings, including the portions which are beneath the lugs, being beveled on the outside.

3. A preformed pipe fitting for erection and installation of welded piping systems for conducting fluid, said fitting having outlets the terminal boundaries of which are adapted to be butt-welded to the ends of adjoining pipe lengths or nipples by fusion welding, each of said terminal boundaries lying substantially in a plane, said fitting being formed with external positioning lugs, more than two in number, at several points around each outlet adapted to receive the ends of adjoining nipples or pipe lengths for temporary support and to facilitate alining, said lugs adapted to be fused to the outside of the pipe lengths or nipples prior to the actual welding of the joints.

4. A preformed pipe fitting for erection and installation of welded piping systems for conducting fluid, said fitting having outlets the terminal boundaries of which are adapted to be butt-welded to the ends of adjoining pipe lengths or nipples by fusion welding, each of said terminal boundaries lying substantially in a plane and being beveled on the outside to form grooves where they abut the pipe lengths or nipples for the reception of molten weld metal, said fitting being formed with external positioning lugs at several points around each outlet adapted to receive the ends of adjoining nipples or pipe lengths for temporary support and to facilitate alining, said lugs adapted to be fused to the outside of the pipe lengths or nipples prior to the actual welding of the joints.

5. In joints for welded pipes, a fitting adapted to be butt-welded to pipe, said fitting having means for alining and temporarily supporting pipe sections before welding, comprising lugs on the fitting adapted to overlie the pipe end and be welded thereto.

6. The method which comprises assembling in abutting relation the outlet of a fitting having projecting lugs and the end of a pipe section, temporarily supporting and alining the same by engaging said lugs over the pipe end, fusing one or more of said lugs to the sides of the pipe section, and circumferentially butt-welding the pipe end to the end of the fitting by fusion.

JAMES L. ANDERSON.